(12) United States Patent
Poyourow et al.

(10) Patent No.: US 7,725,483 B2
(45) Date of Patent: *May 25, 2010

(54) METHOD FOR IMPROVED PROCESSING OF EXPRESSION-BASED DATA

(75) Inventors: David Poyourow, Los Angeles, CA (US); Richard T. Endo, Los Angeles, CA (US); Paul N. Weinberg, Los Angeles, CA (US)

(73) Assignee: SAP, AG, Walldorf (DE)

( * ) Notice: Subject to any disclaimer, the term of this patent is extended or adjusted under 35 U.S.C. 154(b) by 326 days.

This patent is subject to a terminal disclaimer.

(21) Appl. No.: 11/193,306

(22) Filed: Jul. 29, 2005

(65) Prior Publication Data

US 2007/0027890 A1 Feb. 1, 2007

(51) Int. Cl.
G06F 7/00 (2006.01)
G06F 17/00 (2006.01)
G06F 15/16 (2006.01)

(52) U.S. Cl. .................... 707/763; 707/705; 707/758

(58) Field of Classification Search .............. 707/3–7, 707/100–101, 104.1, 102; 717/101, 104–126; 704/5; 705/1–9; 709/200, 236; 715/709–710
See application file for complete search history.

(56) References Cited

U.S. PATENT DOCUMENTS

| 6,535,883 | B1 * | 3/2003 | Lee et al. | 707/100 |
| 6,920,461 | B2 * | 7/2005 | Hejlsberg et al. | 707/103 R |
| 7,003,730 | B2 * | 2/2006 | Dettinger et al. | 715/764 |
| 2004/0006608 | A1 * | 1/2004 | Swarna et al. | 709/220 |
| 2004/0162741 | A1 * | 8/2004 | Flaxer et al. | 705/7 |
| 2005/0289517 | A1 * | 12/2005 | Balfe et al. | 717/126 |
| 2006/0041421 | A1 * | 2/2006 | Ta et al. | 704/5 |
| 2006/0053106 | A1 * | 3/2006 | Bhaghavan et al. | 707/4 |
| 2006/0074731 | A1 * | 4/2006 | Green et al. | 705/8 |
| 2006/0167905 | A1 * | 7/2006 | Liu et al. | 707/100 |
| 2006/0224959 | A1 * | 10/2006 | McGuire et al. | 715/700 |

* cited by examiner

*Primary Examiner*—Cam Y Truong
*Assistant Examiner*—Cecile Vo
(74) *Attorney, Agent, or Firm*—Dalina Law Group, P.C.

(57) ABSTRACT

Expression-based data may comprise data that is processed by a validation expression for example. After a validation expression is created it may then be performed with respect to one or more data values or data records. A validation expression returns a Boolean result that signifies a success or failure result. A validation expression can define complex intra-record tests and inter-record tests with unlimited complexity. In order to improve processing of validations, the system uses virtual data known as calculation fields. Calculation fields are stored in memory at runtime and not in a database thereby eliminating the necessity of selecting and updating records in the database. A dirty bit identifying fields and attributes that need to be calculated based on a dependent data may be used to defer calculation to a later time when the calculation field is displayed or a sort operation occurs for example.

10 Claims, 9 Drawing Sheets

| | Check Pri | Check SK | | SKU | Description |
|---|---|---|---|---|---|
| | | | CA (200) 135-12 | | Superia Print Film |
| | ✓ | ✓ | CA (200) 135-24 | | Superia Print Film |
| | ✓ | ✓ | CA (200) 135-36 | | Superia Print Film |
| | ✓ | ✓ | CH (400) 135-12 | | Superia Print Film |
| | ✗ | ✓ | CH (400) 135-24 | | Superia Print Film |
| | ✓ | ✓ | CH (400) 135-36 | | Superia Print Film |
| | ✓ | ✓ | CN (100) 135-12 | | Superia Print Film |
| | ✓ | ✗ | CN (100) 135-24 | | Superia Print Film |
| | ✓ | ✓ | CZ (800) 135-36 | | Superia Print Film |
| | ✓ | ✓ | EB (100) 135-24 | | Ektachrome Elite Slide Film |
| | ✓ | ✓ | EB (100) 135-36 | | Ektachrome Elite Slide Film |

601 → Check Pri column
602 → Check SK column

Figure 8

| | English [US] | English [UK] | Japanese [JA] |
|---|---|---|---|
| Description | Kodachrome Professional Slide Film | Kodachrome Professional Slide Film | Kodachrome の専門のスライドのフィルム |
| Category | Professional Slide Film | Professional Slide Film | 専門のスライドのフィルム |
| Manufacturer | Kodak | Kodak | Kodak |
| Long Description | Long the leader in variety and Excellent natural color quality with | Long the leader in variety and Excellent natural color quality with | 変化及び技術、コダックの長くリーダーは Excellent natural color quality with superior |
| Pictures | Kodachrome 64 PROFESSIONAL | Kodachrome 64 PROFESSIONAL | Kodachrome 64 PROFESSIONAL |
| Spec Sheets | | | |

801 — Description
802 — Category
803 — Manufacturer
804 — Long Description
805 — Pictures

800

METHOD FOR IMPROVED PROCESSING OF EXPRESSION-BASED DATA

BACKGROUND OF THE INVENTION

1. Field of the Invention

Embodiments of the invention described herein pertain to the field of computer systems. More particularly, but not by way of limitation, one or more embodiments of the invention enable methods for improved processing of expression-based data in a computer system.

2. Description of the Related Art

Known methods for processing expression-based data are generally computationally inefficient. For example, when values are stored in a database and are changed, other values that utilize the changed values are potentially affected. When a small number of values are associated with a particular data modification, there is a large amount of system overhead required in existing systems to update the dependent data. The required steps in the known are include obtaining the affected values from the database, recalculating them and updating the database with the new values. When a large number of values are associated with a particular data modification, the amount of system overhead involved is extremely large. For at least the limitations described above there is a need for a method for improved processing of expression-based data.

BRIEF SUMMARY OF THE INVENTION

Embodiments of the invention are directed to a method for improved processing of expression-based data. Expression-based data may comprise data that is processed by a validation expression for example. After a validation expression is created it may then be performed with respect to one or more records. A validation expression returns a Boolean result that signifies a success or failure result.

As utilized in the context of this disclosure, "fields" are associated with all records of the main data table, i.e., all records in the main data table comprise the same fields. "Attributes" are quantities that are associated with subsets of the main data table, i.e., specific to a given category which is a field in the main data table. Attributes do not reside in the main data table. Therefore, based on the value of a category field or other any other fields of the main data table, attributes may be associated with a subset of the records of the main data table. An "audience" may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. Audiences can be as complex as required to support the number of targets and number of languages, regions, religions, cultures or any other division conceivable. An audience hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. "Lookup tables" are used in order to place a text object for example in one place in the database and which are referenced by a smaller quantity, i.e., a reference identifier or key into the lookup table. Lookup tables save large amounts of space and provide benefits with regards to data integrity since a change of a value in a lookup table may be made once instead of in a million records for example.

A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator, function, dimension or unit names. Instead, the tokens to be used in the expression are selected from drop-down lists, reducing the potential for typing error. For example, pre-defined dimensions and units of measure allow for tokenized input of these elements without requiring manual typing of the desired dimension or unit of measure. One or more embodiments of the invention optionally allow for the user to type in characters that automatically limit the values presented in pick lists, thereby narrowing the possible selections.

Validation expressions can be used to perform a variety of tests that implement sophisticated business logic that goes far beyond simple data integrity checks, including:

Ensuring that non-lookup fields (fields without pick lists) have a legal value (e.g. Price>0).

Ensuring that specific fields have non-Null values when other fields have a particular value (Price>0 when Cost>0).

Comparing the values of different fields to ensure that the relative values are legal (e.g. Price>Cost).

Ensuring that a workflow task is not allowed to proceed until workflow related validations return successful status.

In order to improve processing of expression-based data as used by increasingly complex validations, one or more embodiments of the invention utilize virtual data known as calculation fields. Calculation fields are cached in memory during runtime and used by any data type. Hence any data type can use the calculated field as virtual data that is calculated. Because the calculated field is stored in memory at runtime and not in a database, the system is only required to recalculate the virtual filed by accessing memory rather than retrieving records from and writing records to the database. In instances where a change to a value impacts a significant number of other values, use of the virtual calculation field enables the system to avoid overhead intensive operations involved in accessing data from a database. Hence embodiments of the invention provide a high performance virtual field capability where the virtual field value is cached in memory as opposed to the database and recalculation can be performed in memory without use of the persistent values in the database. One or more embodiments of the invention avoid re-calculating altogether by keeping a dirty bit identifying fields and attributes that need to be calculated based on a dependent data change for example. Calculation can then be performed at a later time when the desired data item is displayed or a sort operation occurs that uses the data item for example.

BRIEF DESCRIPTION OF THE DRAWINGS

The above and other aspects, features and advantages of the invention will be more apparent from the following more particular description thereof, presented in conjunction with the following drawings wherein:

FIG. 1 illustrates an embodiment of an application comprising a validation metadata user interface.

FIG. 3 illustrates an embodiment of the validation expression builder user interface.

FIG. 6 illustrates an embodiment of the record details user interface comprising columns representing validation results.

FIG. 8 illustrates an embodiment of the audience user interface pane.

DETAILED DESCRIPTION

Figure 2:
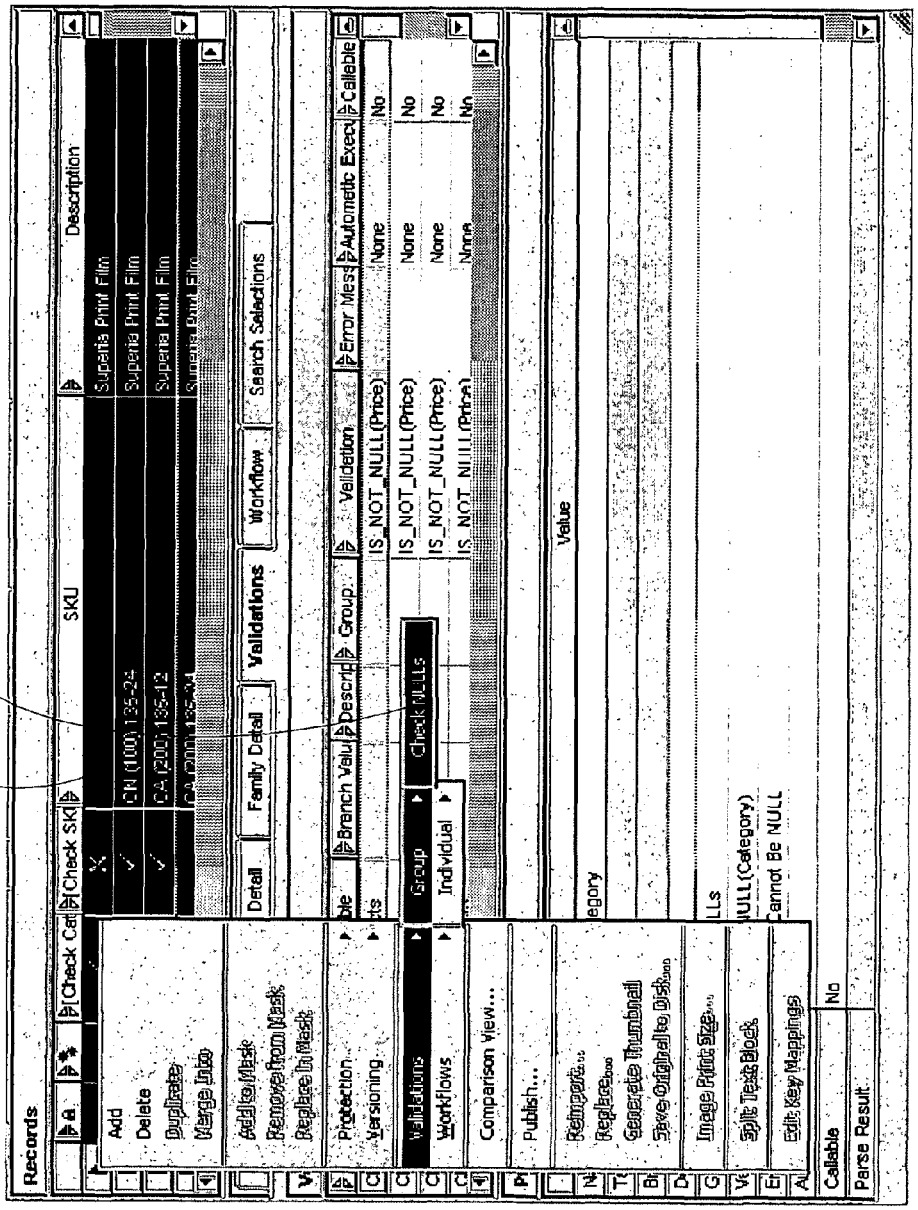
FIG. 2 illustrates an embodiment of a menu used for manual execution of a validation group.

A method for improved processing of expression-based data will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Expression-based data may comprise data that is processed by a validation expression for example. After a validation expression is created it may then be performed with respect to one or more data values or data records. A validation expression returns a Boolean result that signifies a success or failure result. A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator, function, dimension or unit names. Instead, the tokens to be used in the expression are selected from drop-down lists, reducing the potential for typing error. For example, pre-defined dimensions and units of measure allow for tokenized input of these elements without requiring manual typing of the desired dimension or unit of measure. One or more embodiments of the invention optionally allow for the user to type in characters that automatically limit the values presented in pick lists, thereby narrowing the possible selections.

In order to improve processing of validations of increasing complexity, one or more embodiments of the invention utilize virtual data known as calculation fields. Calculation fields are cached in memory during runtime and used by any data type. Hence any data type can use the calculated field as virtual data that is calculated. Because the calculated field is stored in memory at runtime and not in a database, the system is only required to recalculate the virtual filed in memory rather than retrieve records from and write records to the database. In instances where a change to a value impacts a significant number of other values, use of the virtual calculation field enables the system to avoid the more overhead intensive operations involved in using data from the database. Hence embodiments of the invention provide a high performance virtual field capability where the virtual field value is cached in memory as opposed to the database and recalculation can be performed in memory without use of the persistent values in the database. One or more embodiments of the invention avoid re-calculating altogether by keeping a dirty bit identifying fields and attributes that need to be calculated based on a dependent data change for example. Calculation can then be performed at a later time when the item is displayed or a sort operation occurs for example. An example use of a computational field is illustrated given a validation expression such as "SalesPrice>(Cost*(1−TaxPercentage))". In this example, if TaxPercentage is based on two fields "StateTax" and "LocalTax", and is designated as a computational field, then the value TaxPercentage is obtained from memory without accessing a database in order to calculate the validation result. For large sets of records and large groups of validations, the use of calculation fields significantly speed execution.

Figure 1:
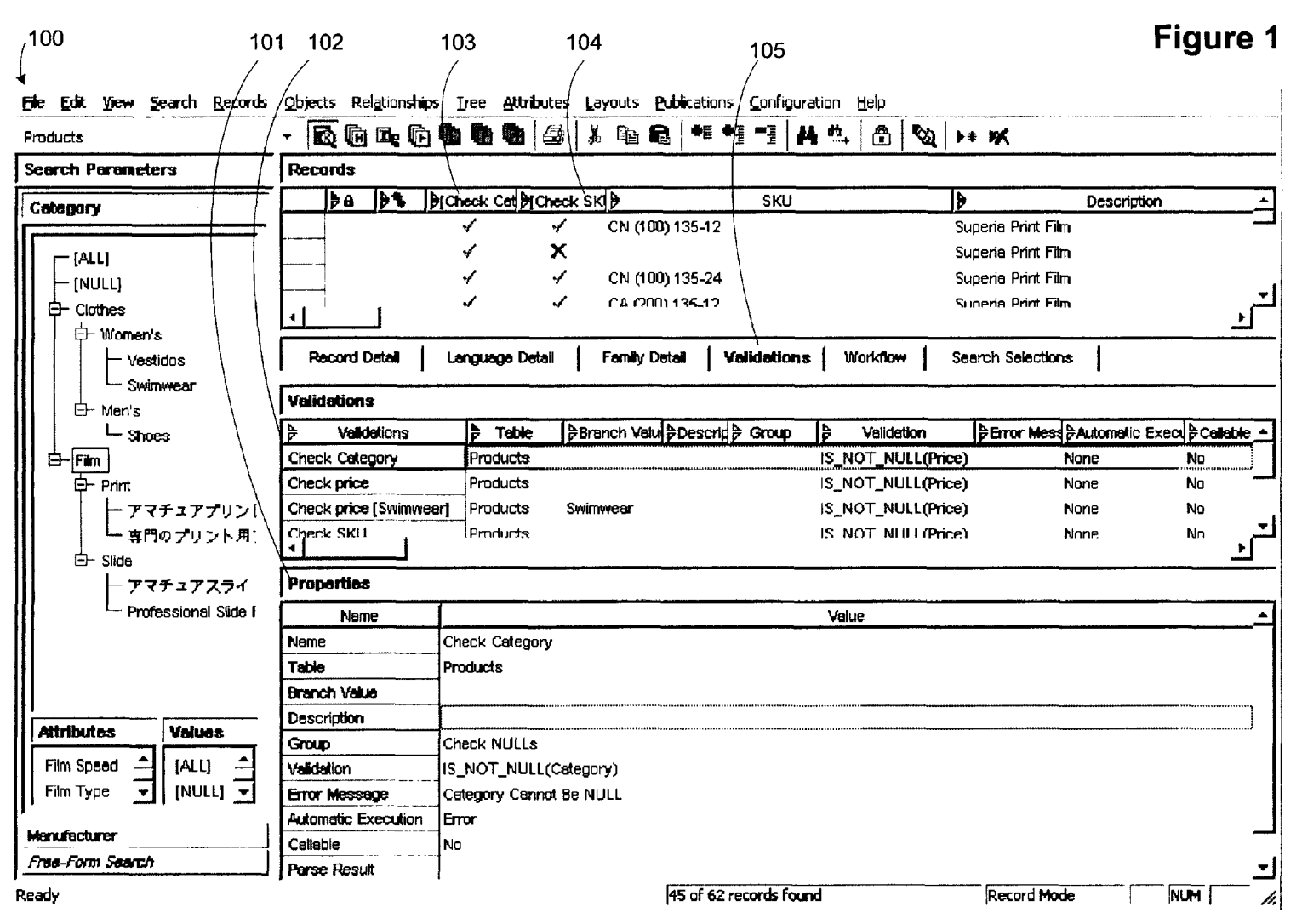

FIG. 1 illustrates an embodiment of an application comprising a validation metadata user interface. The elements in application 100 comprise a validation tab 105 comprising rows of validations 102, each of which extends horizontally showing the name of the validation (e.g., "Check Category", "Check Price", "Check Price[Swimwear]", "Check SKU"), the table(s) associated with the validation, the branch value(s) used for branching the validation, a description of the validation, the group(s) that the validation is associated with, the validation expression, an error message to display when the validation fails, an automatic execution value of none, warning or error, a callable flag for determining if the validation is callable from another validation and a parse result read-only success or failure field that shows the results of parsing the validation expression. The properties of a selected validation, in this case the "Check Category" row in rows of validations 102 are shown in validation properties edit area 101. Each row in validation properties edit area 101 corresponds to each column in rows of validations 102. Each row in validation properties edit area 101 is edited by clicking the mouse in the corresponding row and entering information. The result of executing a validation or validation group is shown as a column in the records list, for example "[Category]" 103 and "[Check SKU]" 104 showing the status of each validation for example as will be described further below.

Figure 3:
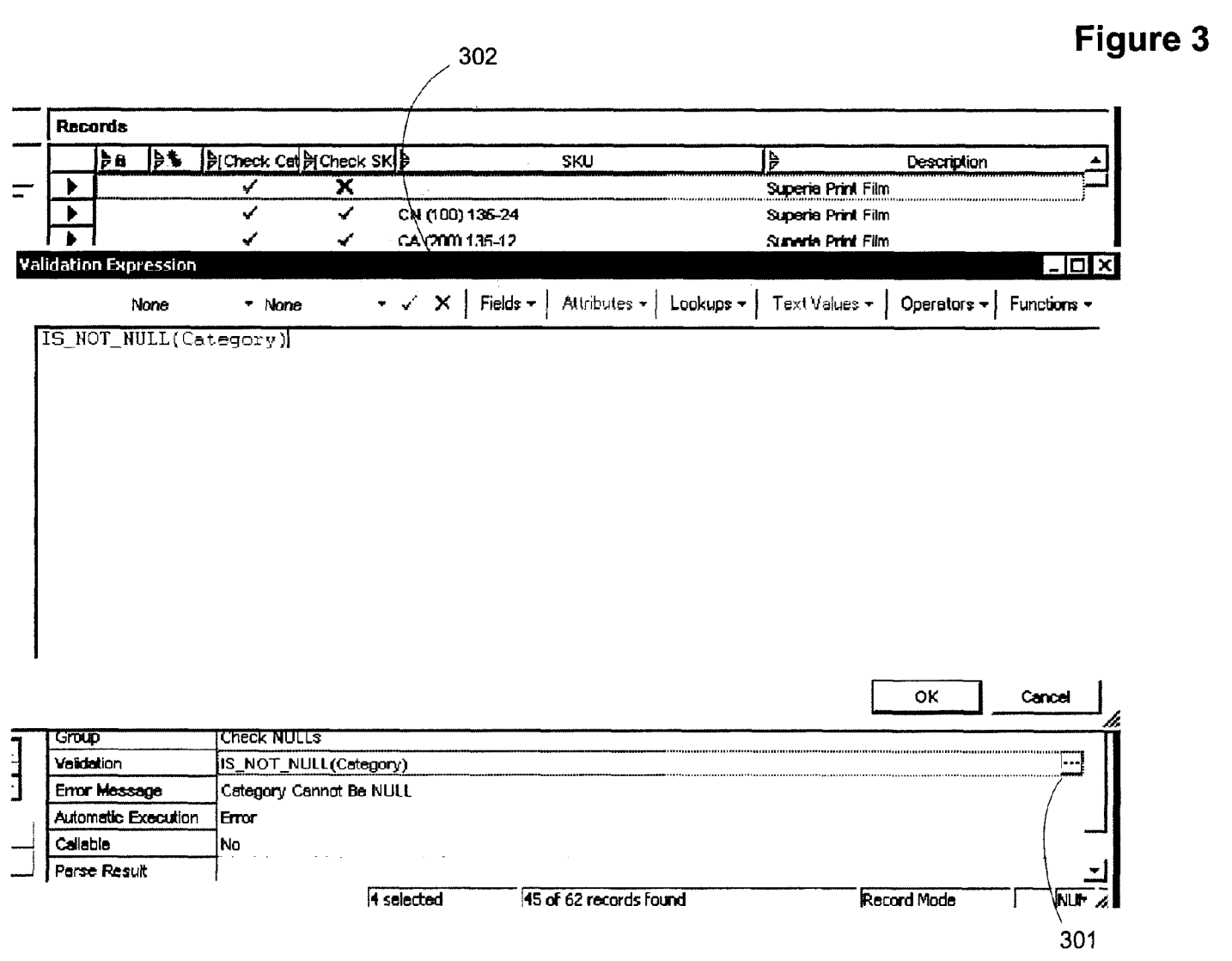

FIG. 2 illustrates an embodiment of a menu used for manual execution of a validation or validation group. A validation expression may be performed manually or automatically. In order to manually perform a validation, the system highlights the records selected by a user, e.g., selected records 201 and the validation CheckNULLs 202 is performed by right clicking the mouse in any of the selected records 201 and choosing this validation. In this example, CheckNULLS is actually a validation group that calls other validations to check for nulls in the respective fields/attributes. An example validation expression is shown in FIG. 3. Validation expression builder 302 is shown performing an operation on a field which returns a Boolean result.

A validation expression may be placed into one or more groups and performed as a group with the success or failure indicated for each record for example visually. Each validation group is a set of validations that can be performed as a group as a single operation rather than requiring each individual validation to be separately performed. Validation groups allow for the organized use of large sets of related validations, eliminating the likelihood of forgetting to perform any of the individual validations in the group. For example, Trading Partner X may have a total of 125 validations while Trading Partner Y has a total of 143 validations, many of them in common with Trading Partner X. When a validation group is performed against a set of records, each individual validation in the group is performed, and an individual success or failure result for each validation for each record is generated. Performing a large group of validations with a large amount of dependent data over a large number of records is readily accomplished with one or more embodiments of the invention.

Validation groups may be organized into a hierarchy. A validation group hierarchy is similar to a data group hierarchy in that it does not show up in the drop-down list of tables and cannot be edited directly. Instead, the validation group hierarchy may be edited in one or more embodiments of the invention using a tree view user interface element or any other type of interface element capable of displaying a hierarchy. For example, the hierarchy may then be modified using a context menu editable tree to add siblings and children, and to delete and rename existing nodes.

Figure 4:
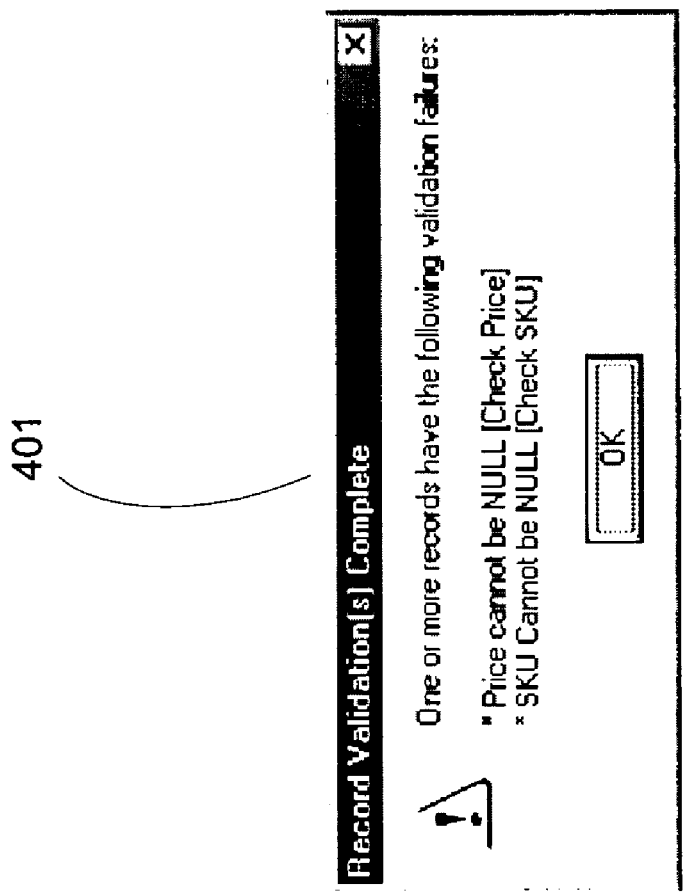
FIG. 4 illustrates an embodiment of the validation warning user interface.
Figure 5:
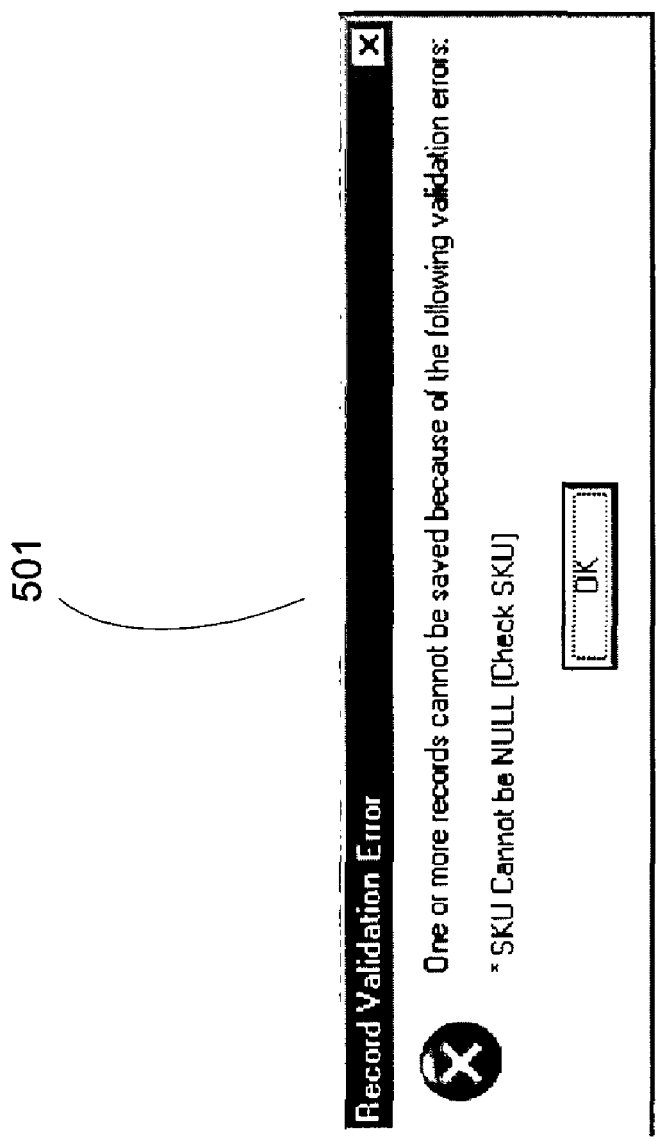
FIG. 5 illustrates an embodiment of the validation error user interface.

Validation execution results in different behaviors based on the level of execution of the validation. For example, in one level a validation execution can be designated as a warning validation. In this mode a warning is displayed to a user before saving a record if a validation fails, although the record update still occurs. In another level of execution, a validation execution may be designated as an error validation for example. In this mode, the user interface displays the error and also prevents the record from being saved if a validation fails, i.e., if the Boolean value returned from the validation is FALSE. For validation groups, the final outcome of multiple validations are the results of each and every validation, so if any of the validations in a group fails, and the level of execution for the failed validation is warning level, then the warning is displayed and if the level of execution for another failed validation is error level, then the error is displayed and the update does not occur with respect to the data record that the validation refers to. Other embodiments of the invention may perform short circuit checking and display only the first error encountered in case of a large amount of validation errors related to one element. This saves the user from interacting with a multiplicity of error dialogs for example. Other embodiments of the invention may utilize a global level of execution for a validation group so that if any validation in the group fails, the whole group fails which prevents any of the updates associated with the group from occurring. Any other method of combining the results of the validations in a validation group are in keeping with the spirit of the invention. When the level of execution is warning level, then the warning dialog of FIG. 4 is displayed although the records in the database or in the calculation fields may be updated. However, when the level of execution is error level, the error dialog of FIG. 5 is displayed and no update of the field/attribute or calculation field is allowed to occur. Embodiments of the invention ensure that the processing of expression-based data occurs in the most efficient manner possible. Utilization of calculation fields where needed greatly speeds the execution where dependent data exists whether the validation is executed manually or automatically. When the number of dependent fields is large and the number of records being validated is large, the time savings are tremendous.

Figure 7:
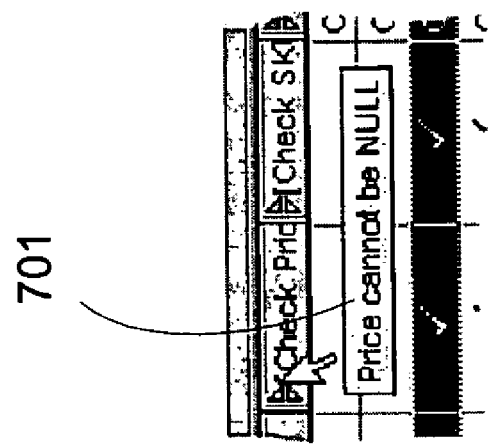
FIG. 7 illustrates a portion of an embodiment of the record details user interface comprising a tooltip showing a warning message associated with the validation result associated with the column.

When a validation expression is performed with respect to one or more records, the success or failure may be indicated for each record in an interface. A validation expression may be performed automatically for a database update to warn against or prevent the entry of invalid data and ensure data integrity. A validation expression may also be automatically performed from one or more workflows to implement a business process with system-enforced data integrity. After performing a validation, a column may be added to the display of records for each validation indicating success or failure for that validation for each and every record, as shown in FIG. 6. Each validation result column may be named with the validation name in square brackets ([ ]) to denote that the column is not actually a field in the record. Naming the columns in this manner is not a requirement but simply signifies that the column is not a field in the database. Each validation result Boolean (TRUE or FALSE) value may be shown as check marks for TRUE or X's for FALSE results in the column, any other method of showing TRUE and FALSE values is in keeping with the spirit of the invention. When the mouse pointer is moved over the column title, a tooltip may be displayed showing the error message associated with the validation, as shown in FIG. 7. Any other method of showing the error associated with a validation column is in keeping with the spirit of the invention. Each validation result column may be sorted to group records that failed or succeeded with respect to the validation. Each record may then be edited to correct observed error(s). Sorting the columns may be performed by clicking on the column header. Clicking a second time on the column header switches the order of the records from ascending to descending with respect to the value in the field. See FIG. 7, by clicking at the location of the pointer the validation column is sorted with correctly validating rows separated from records that fail validation. Clicking again in the column header switches the uppermost records (for example the correctly validating records) with the lowermost records (for example the records failing validation).

When combined with a user interface that visually displays records, a validation expression is in effect a search expression. Since a record matching a search either matches or does not match a search, the value of searching for a given value or combination of values is a Boolean. Since validations return Boolean values, i.e., TRUE and FALSE, the validation expressions described herein may be used as searches. In this manner, the creation of expressions for searching for particular records does not have to be duplicated within a separate search facility since the records that successfully match a validation or fail a validation are defined by the validation expression itself. A drill down search for example may make use of a validation for further drilling down into a database. For example, by dragging and dropping a validation listed in rows of validations 102 to the search parameters pane in the leftmost tree view in FIG. 1, further drill down into the records shown in the upper right portion of FIG. 1 is achieved. By performing a SHIFT-drag and drop of the validation listed in rows of validations 102 into the search parameters pane in the leftmost tree view in FIG. 1, the validations that fail are drilled down into. Another embodiment of the invention makes the default drag and drop action correspond to drilling down into records that fail validation and conversely SHIFT-drag and drop allows for records that correctly validate to be drilled down. Any other method of instantiating validations to further limit a search are in keeping with the spirit of the invention including use of another vertical tab named "Validation", i.e., in addition to the "Category", "Manufacturer" and "Free-Form Search" vertical tabs on the left side of FIG. 1 from which to select validations to use for searching. A Validation vertical tab may comprise a list of validations or a list or tree of the validations within validation groups that can be click on to provide further limiting of the category or manufacturer or free-form searches. The Category vertical pane shown in FIG. 1 with the tree view is a hierarchical split of the main data table for example a product table into a taxonomy of products. By clicking in the tree, all of the records that belong to that portion of the taxonomy are displayed in the upper right portion of FIG. 1, the record list. The Manufacturer vertical tab, when asserted, displays a manufacturer pane that lists all of the manufactures in the main data table, i.e., the manufacturers of the products that are listed in the main data table. Combining these is one method of creating a hierarchical family taxonomy that builds on the existing category hierarchy in the main data table.

FIG. 8 illustrates an embodiment of the audience user interface an embodiment of which has been simplified to be language and country specific. Audience pane 800, comprises a horizontal set of columns that represent the supported audiences and with a vertical axis display each field for selected records comprising fields named description 801, category 802, manufacturer 803, long description 804 and pictures 805. For each field, any value that is not found in the leftmost column, e.g., "English [US]", is taken from the next column to the right. In addition, the record interface may display each of the primary level of inheritance fields in black and the inherited fields in other colors or bold to show that they are inherited and are not found with respect to the audience through which the user has chosen to view the data with. Other methods of forming a hierarchy of audiences that is not table specific are in keeping with the spirit of the invention, such as forming a hierarchy of audiences in a table or tree. Computational fields may be utilized for any field or attribute in the system including fields that are audience enabled.

Figure 9:
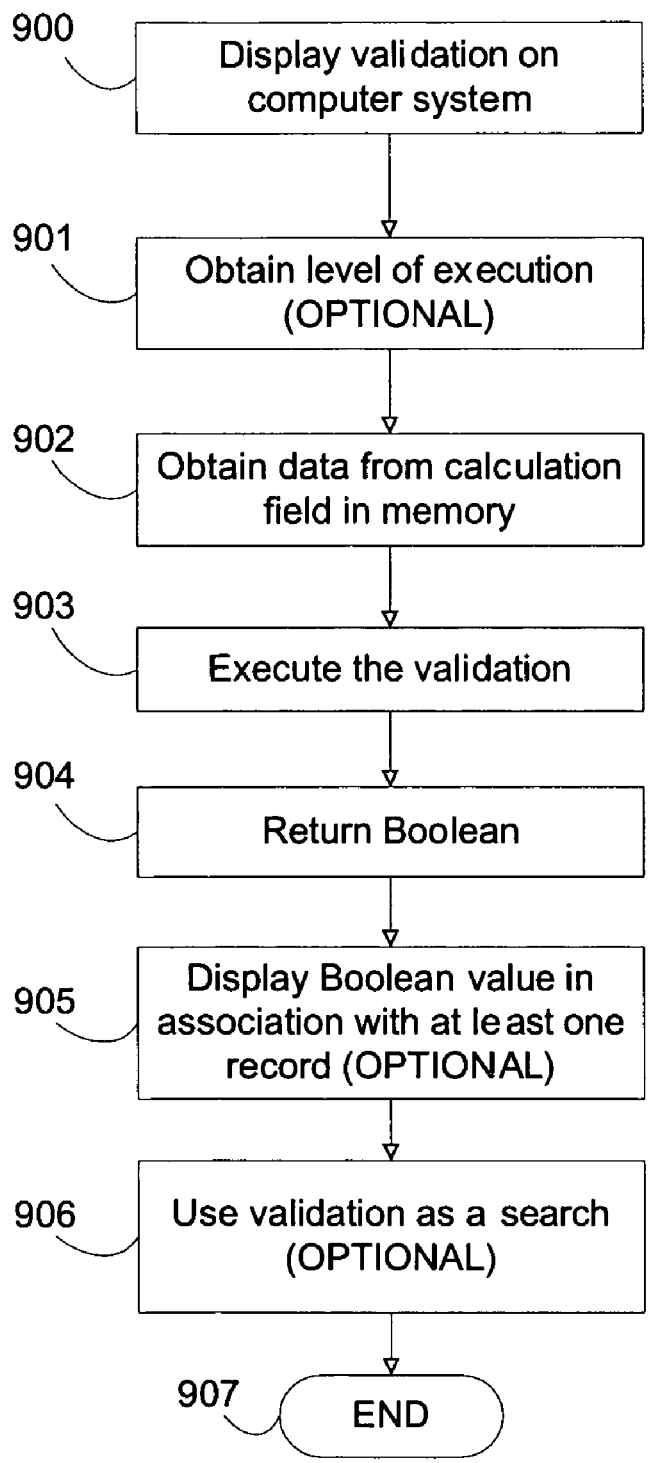
FIG. 9 illustrates a flowchart showing an embodiment of the invention for improved processing of expression-based data.

FIG. 9 illustrates a flowchart showing an embodiment of the invention for improved processing of expression-based data. A validation is displayed at 900, the properties of the validation may be viewed and edited at this time, or the validation may be displayed to a software module programmatically. The level of execution is optionally obtained at 901 which comprises selecting warning level or error level. Any other granularity of levels may be implemented in keeping with the spirit of the invention such as "none" which will not show any warning or error level for example. At least one calculation field data item is obtained at 902. The system executes the validation at 903 and the system returns the Boolean result of the validation at 904. The Boolean value is optionally displayed in association with at least one record, for example as a column associated with each record at 905. The validation may optionally be used as a search at 906, for example as a standalone search or as part of a drill-down search to further limit the results of the search.

U.S. Pat. No. 6,754,666 entitled "Efficient Storage And Access In A Database Management System" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 11/142,809, entitled "Multi-Layered Data Model for Generating Audience Specific Documents" filed May 31, 2005, U.S. patent application Ser. No. 11/141,984 entitled "Interface for Indicating the Presence of Inherited Values in a Document" filed May 31, 2005 are all hereby incorporated herein by reference and used in combination with the embodiments of the invention enabled herein.

While the invention herein disclosed has been described by means of specific embodiments and applications thereof, numerous modifications and variations could be made thereto by those skilled in the art without departing from the scope of the invention set forth in the claims.

What is claimed is:

1. A computer system comprising a memory for improved processing of expression-based data validation configured to:
   generate at least one token-based menu for an expression-builder user interface for a computer system database, wherein said token-based menu comprises a drop-down list of at least one token;
   display said expression-builder user interface of said computer system database comprising said at least one token-based menu to create a validation wherein said validation comprises a Boolean validation expression wherein execution of a validation expression returns a result that indicates integrity of data in a record of said computer system database;
   provide said expression-builder user interface to validate a plurality of records in said computer system;
   provide a calculation field in said memory coupled to said expression-builder user interface wherein said calculation field is cached in said memory at run time, said memory is external to said computer system database, and further wherein said calculation field comprises a computed value computed from token-based expressions describing data in said computer system database and further where said calculation field is coupled to said expression-builder user interface;
   obtain said computed value from said calculation field;
   execute said validation expression comprising said computed value to produce a Boolean truth result of validation for each of said plurality of records, and wherein said validation expression is further configured to set a tooltip value for a validation result column associated with said plurality of records on said user interface, and wherein said tooltip value shows a message that is associated with said validation;
   wherein when said Boolean truth result of validation comprises a failure, obtain a level of execution for said validation wherein said level of execution comprises a plurality of levels; and,
   return said Boolean truth result of validation for each of said plurality of records.

2. The computer system 1 further configured to:
   use said validation as a search filter.

3. The computer system of claim 1 further configured to:
   limit a drill-down search using said validation in conjunction with a hierarchal search tool.

4. The computer system of claim 1 further configured to:
   limit a drill-down search using said validation in conjunction with a free form search tool.

5. The computer system of claim 1 further configured to:
   display at least one drop-down list of attributes, wherein said at least one token-based menu comprises said least one drop-down list of attributes; and,
   build said validation from user selections from said at least one drop-down list of attributes.

6. The computer system of claim 1 further configured to:
display a warning, wherein said plurality of levels comprises said warning; and,
permit an update of at least one record.

7. The computer system of claim 1 further configured to:
deny an update of at least one record; and
display an error, wherein said plurality of levels comprises said error.

8. The computer system of claim 1 further configured to:
display said Boolean truth result in association with at least one record on which said validation is executed; and,
display said Boolean truth result in a column associated with said at least one record on said expression-builder user interface.

9. The computer system of claim 1 further configured to:
group a plurality of validations into a validation group;
wherein said execute step further comprising execute all validations in said validation group.

10. The computer system of claim 9 further configured to:
form a hierarchy comprising said plurality of validations.

* * * * *